(12) United States Patent
Iwabuchi et al.

(10) Patent No.: US 7,118,058 B2
(45) Date of Patent: Oct. 10, 2006

(54) SPINNING REEL ROTOR

(75) Inventors: Masakazu Iwabuchi, Tondabayashi (JP); Keigo Kitajima, Sakai (JP)

(73) Assignee: Shimano Inc., Osaka (JP)

( * ) Notice: Subject to any disclaimer, the term of this patent is extended or adjusted under 35 U.S.C. 154(b) by 350 days.

(21) Appl. No.: 10/367,826

(22) Filed: Feb. 19, 2003

(65) Prior Publication Data

US 2003/0173437 A1 Sep. 18, 2003

(30) Foreign Application Priority Data

Mar. 18, 2002 (JP) .............................. 2002-074202

(51) Int. Cl.
*A01K 89/01* (2006.01)
(52) U.S. Cl. ..................... 242/231; D22/140
(58) Field of Classification Search ............... 242/231, 242/232, 224, 310, 311; D22/140, 141
See application file for complete search history.

(56) References Cited

U.S. PATENT DOCUMENTS

| | | | |
|---|---|---|---|
| 4,171,108 A * | 10/1979 | Ishida et al. ................ | 242/231 |
| 4,921,187 A * | 5/1990 | Yamaguchi et al. ......... | 242/232 |
| 5,605,298 A | 2/1997 | Shimozaki et al. | |
| D405,154 S * | 2/1999 | Iwabuchi ................... | D22/141 |
| 6,318,654 B1 * | 11/2001 | Amano et al. .............. | 242/231 |
| 6,672,525 B1 * | 1/2004 | Koike et al. ................ | 242/231 |

FOREIGN PATENT DOCUMENTS

| | | | | | |
|---|---|---|---|---|---|
| JP | 407177836 A | * | 7/1995 | ................ | 242/231 |
| JP | 08256644 A | * | 10/1996 | ................ | 242/231 |
| JP | 411137133 A | * | 5/1999 | ................ | 242/231 |
| JP | 02000157117 A | * | 6/2000 | ................ | 242/231 |
| JP | 2000-279065 A | | 10/2000 | | |
| JP | 2001-136874 A | | 5/2001 | | |
| JP | 2003274816 A | * | 9/2002 | ................ | 242/231 |

* cited by examiner

*Primary Examiner*—Emmanuel M Marcelo
(74) *Attorney, Agent, or Firm*—Global IP Counselors, LLP

(57) ABSTRACT

A spinning reel rotor is rotatively mounted onto a reel unit of a spinning reel and winds fishing line onto a spool. The rotor is provided with a cylindrical portion, a bail arm, and first and second rotor arms having first and second cover members. The cylindrical portion is rotatively mounted to an end of the reel unit. The first and second rotor arms extend in the direction away from the reel unit from diametrically opposing positions of the reel unit side end portion of the cylindrical portion. The second cover member covers the outside of the second rotor arm and has a plurality of through holes formed in its outside surface. In a spinning reel rotor to which cover members are mounted, it is possible to inexpensively prevent the rotor from being scratched such that its appearance can be maintained without losing the classic look of the reel.

18 Claims, 14 Drawing Sheets

SPINNING REEL ROTOR

BACKGROUND OF THE INVENTION

1. Field of the Invention

This invention generally relates to rotors. More specifically, the present invention relates to spinning reel rotors that are rotatively attached to a reel unit of a spinning reel, and wind fishing line around a spool.

2. Background Information

Spinning reels in general have a reel unit that is mounted to a fishing rod, a rotor rotatively fitted to the reel unit for guiding the fishing line, and a spool onto which fishing line that has been guided by the rotor is wound. The rotor includes a rotor body and a bail arm pivotably mounted to the rotor body.

The rotor body has a cylindrical portion (an example of a support portion) that is rotatively fitted to the body of the reel and first and second rotor arms disposed opposing one another extending diametrically outward from the rear end portions of the cylindrical portion. Both rotor arms have first and second connection portions and first and second arm portions. The first and second connection portions are disposed on opposite positions on the rear end portions of the cylindrical portion. The first and second arm portions are bent from the connection portions and extend forward, defining a gap from the cylindrical portion. The cylindrical portion at its rear end has a ring-shaped large diameter portion which is diametrically larger than the rest of the cylindrical portion. The pair of connection portions extends diametrically outward from the opposing positions on a peripheral surface of the large diameter portion.

Conventionally known among this type of rotor are rotors to which cover members are fitted to prevent the outside surface of both rotor arms being scratched. The cover members are mounted to parts that come into contact with the ground easily when a fishing rod to which the spinning reel is attached is placed on the ground. For the cover members, a metal that is comparatively durable and not easily corroded, such as a stainless alloy has been used. Alternatively, the cover members can be made of a synthetic resin or a pliable metal such as aluminum, with a hard coating such as a relatively hard UV paint being applied on the surface. Also, conventionally the cover members are covered with an elastic protector such as a synthetic rubber. In this manner, providing cover members prevents scratches. Furthermore, the cover members can be replaced if they are damaged. Accordingly, the reel can regain its attractive original appearance. Furthermore, the cover members can be replaced if they are damaged. Accordingly, the reel can regain its attractive original appearance.

With conventional rotors, however, it is difficult to avoid scratching even if the external surface of the rotor arm is covered by a cover member made of, for example, a hard stainless alloy. Moreover, scratches may be conspicuous across the entire surface of the cover member depending on the posture of the rotor arm. In this manner, scratches covering the cover member due to use of the spinning reel make the spinning reel unattractive. Also, providing a hard coating or protector does not yield the classic look of metal and can lead to increased costs.

In view of the above, there exists a need for spinning reel rotor which overcomes the above mentioned problems in the prior art. This invention addresses this need in the prior art as well as other needs, which will become apparent to those skilled in the art from this disclosure.

SUMMARY OF THE INVENTION

Thus, it is a purpose of the present invention to inexpensively prevent scratches on spinning reel rotors to which cover members are fitted, such that the rotors do not lose the classic look of the reel due to scratches on the rotor arm,.

A spinning reel rotor according to a first aspect of the invention is a rotor rotatively fitted to a reel unit of a spinning reel for winding fishing line onto a spool, and includes a supporting portion, first and second rotor arms, and a bail arm. The supporting portion is rotatively mounted to an end of the reel unit. The first and second rotor arms extend in a direction away from the reel unit from diametrically opposing positions on the end portion of the supporting portion on the reel unit side. At least one of the first and second rotor arms has a plurality of uneven portions formed in its outside surface. The bail arm is for guiding fishing line, and is pivotably fitted to the front ends of both rotor arms.

With this rotor, a plurality of uneven portions are formed in the outside surface of at least one of the rotor arms. Thus, there is a smaller area of contact with the ground when the spinning reel is placed on the ground while still mounted to the fishing rod, than in cases where there are no uneven portions or there is only one uneven portion. For this reason, it is difficult for scratches resulting from use to spread over the entire reel with the present invention. Also, scratches on the rotor arm can be kept from detracting from the appearance of the reel. Moreover, because it is not necessary to provide a protector, an increase in costs can be curbed without affecting the classic look of the reel.

In a spinning reel rotor according to a second aspect of the invention, in the rotor according to the first aspect of the invention, the first and second rotor arms include first and second connection portions, first and second arm portions, and a cover member. The first and second connection portions are disposed in opposition to an outer peripheral surface of the supporting portion on the side near the reel unit. The first and second arm portions extend from the first and second connection portions in a direction away from the reel unit. The cover member covers the outside surface of at least one of the arm portions, and has the plurality of uneven portions in its outside surface. In this case, the plurality of uneven portions are formed in the cover member, and thus it is unlikely that scratches resulting from use will spread over the entire reel. Accordingly, scratches on the cover member can be kept from affecting the outward appearance. Moreover, because it is not necessary to provide a protector, an increase in costs can be curbed without affecting the classic look of the reel.

In a spinning reel rotor according to a third aspect of the invention, in the rotor according to the second aspect of the invention, the cover member is detachably mounted to at least one of the arm portions. In this case, the cover member can be replaced when the cover member is scratched and detracts from the appearance of the spinning reel. In this manner, the original attractive appearance can be restored.

In a spinning reel rotor according to a fourth aspect of the invention, in the rotor according to the second or third aspects of the invention, the bail arm includes first and second bail-supporting members pivotably mounted to the front end of the first and second rotor arms, respectively, a fixed shaft provided in the first bail-mounting member, a line roller rotatively mounted to the fixed shaft, a fixed shaft cover provided at the front end of the fixed shaft, and a bail connecting the second bail-supporting member and the fixed shaft cover, and the cover member covers the outside of the second arm portion. In this case, a cover member having uneven portions covers the outside of the second arm portion, inside which mechanisms such as the bail tripping mechanism does not necessarily have to be provided, and thus the shape of the uneven portions can be set freely and innovations in the design can be achieved.

In a spinning reel rotor according to a fifth aspect of the invention, in the rotor according to any of the second to fourth aspects of the invention, the uneven portions are through holes that pass through the cover member. In this case, the through holes allow a wide variety of designs to be achieved.

In a spinning reel rotor according to a sixth aspect of the invention, in the rotor according to any of the first to fourth aspects of the invention, the uneven portions are recessed portions formed recessed from the outside surface of the rotor arms. In this case, the recessed portions, which are not through holes, allow a wide variety of designs to be achieved, and also allow the interior to be hermetically closed, and thus mechanisms that are provided inside the rotor arms are unlikely to corrode.

In a spinning reel rotor according to a seventh aspect of the invention, in the rotor according to any of the first to fourth aspects of the invention, the uneven portions are prominent portions formed protruding from the outside surface of the rotor arms. In this case, the prominent portions, which are not through holes, allow a wide variety of designs to be achieved, and also widen the space within the cover members, and thus mechanisms can be more readily accommodated within the rotor arm.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Overall Configuration and Reel Unit Configuration

Figure 1:
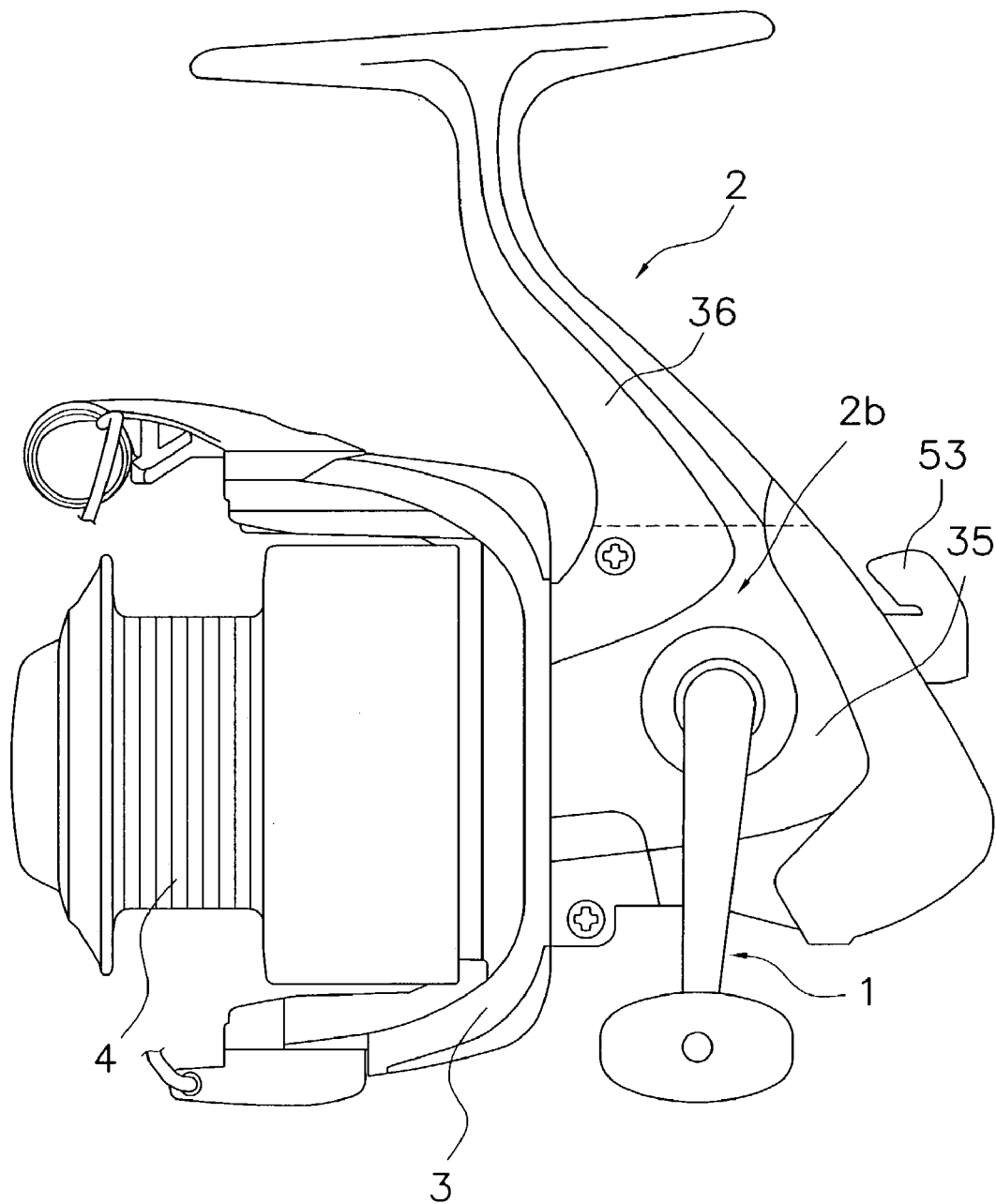
FIG. 1 is a side view of a spinning reel according to one embodiment of the present invention.
Figure 2:
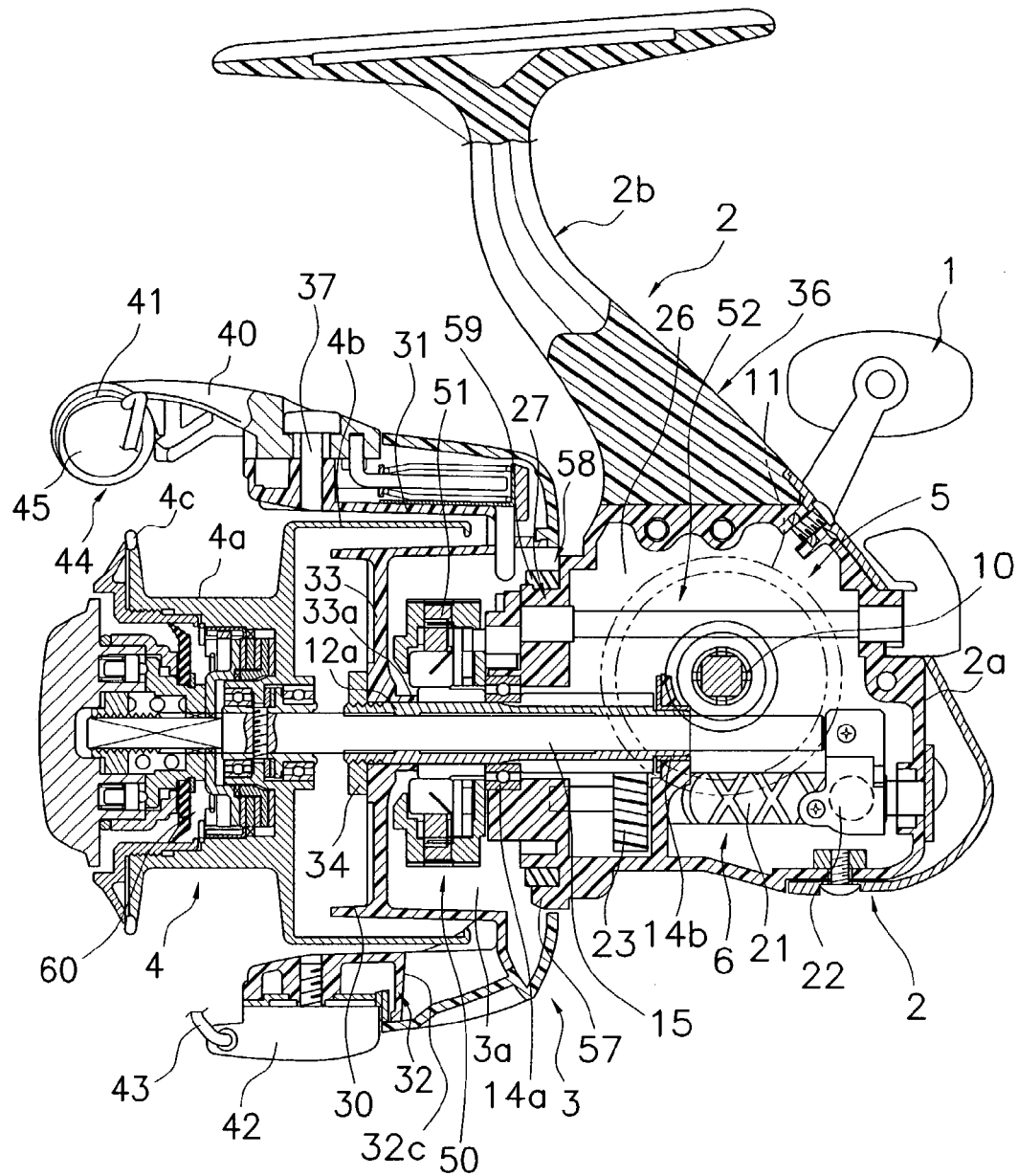
FIG. 2 is a side cross-sectional view of the spinning reel according to the embodiment of the present invention.

As shown in FIGS. 1 and 2, a spinning reel according to an embodiment of the present invention is provided with a reel unit 2 rotatively supporting a handle 1 and mounted to a fishing rod, a rotor 3, and a spool 4. The rotor 3 is for winding fishing line onto the spool 4, and is rotatively supported at the front of the reel unit 2. The fishing line is wound around the outer peripheral surface of the spool 4, which is disposed at the front of the rotor 3 and can be shifted front and rear. It should be noted that the handle 1 can be mounted to the left side of the reel unit 2 as shown in FIG. 1, or to the right side of the reel unit 2 as shown in FIG. 2.

The reel unit 2 principally includes a casing 2a for supporting the rotor 3 and the spool 4, and a lid portion 2b detachably screwed to the casing 2a.

The casing 2a is, for example, made of a polyamide-based synthetic resin reinforced by glass fibers, and is produced by injection molding. The casing 2a has an opening, and a mechanism accommodating space 26 is provided inside the casing 2a. The mechanism accommodating space 26 is provided with a rotor drive mechanism 5 for rotating the rotor 3, an oscillating mechanism 6 for shifting the spool 4 back and forth to uniformly wind in the fishing line, and a power transmission mechanism (not shown) for transmitting a rotation of the handle 1 to the oscillating mechanism 6. A substantially circular rotation support portion 27 for rotatively supporting the rotor 3 is formed at the front of the casing 2a.

The lid portion 2b is made of an aluminum alloy, and is produced by die casting, for example. As shown in FIG. 1, the lid portion 2b has a thin-walled cover portion 35 covering the opening of the casing 2a, and a mounting leg portion 36 extending upward from the cover portion 35.

Rotor Configuration

The rotor 3, as shown in FIG. 2, includes a cylindrical portion 30 (an example of supporting portion) rotatively mounted to an end of the reel unit 2 and open at its rear end to form an evacuation 3a, first and second rotor arms 31 and 32 provided opposing each other on the sides of the cylindrical portion 30, and a bail arm 44 pivotably mounted to the front ends of the rotor arms 31 and 32 for guiding the fishing line onto the spool 4. The cylindrical portion 30 and the two rotor arms 31 and 32 are made of a synthetic resin, for example, and are formed as a single unitary unit.

The cylindrical portion 30 is arranged on the outer peripheral side of the rotation support portion 27 of the casing 2a. A front wall 33 is formed at a front portion of the cylindrical portion 30, and a boss 33a is formed at the center of the front wall 33. A front portion 12a of a pinion gear 12 and a spool shaft 15 pass through a through hole in the boss 33a. A nut 34 is disposed at the front of the front wall 33, and this nut 34 fastens the rotor 3 to the pinion gear 12 by being threadedly coupled to a male threaded portion formed at the front end 12a of the pinion gear 12.

Figure 3:
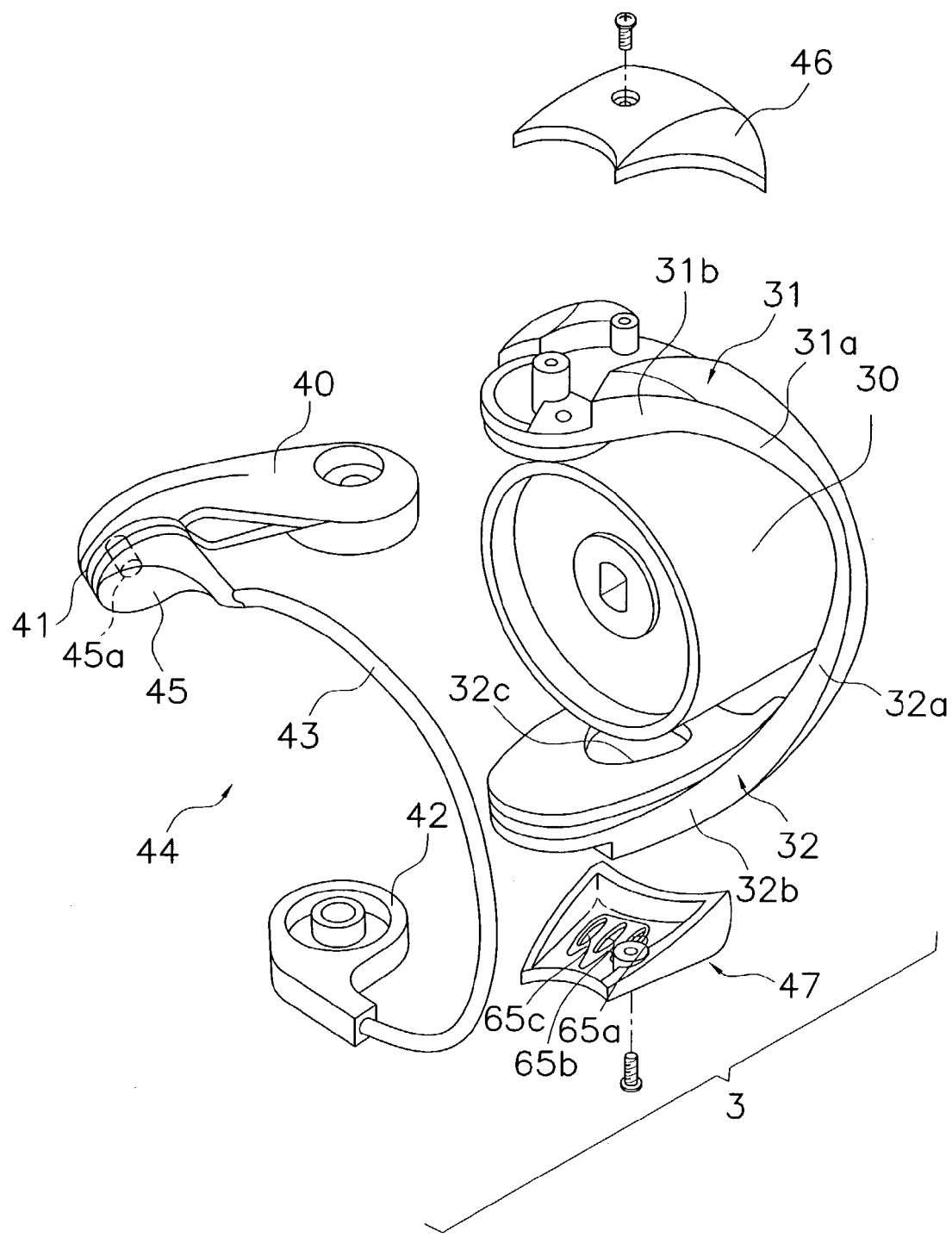
FIG. 3 is an exploded perspective view of the rotor according to the embodiment of the present invention.
Figure 4:
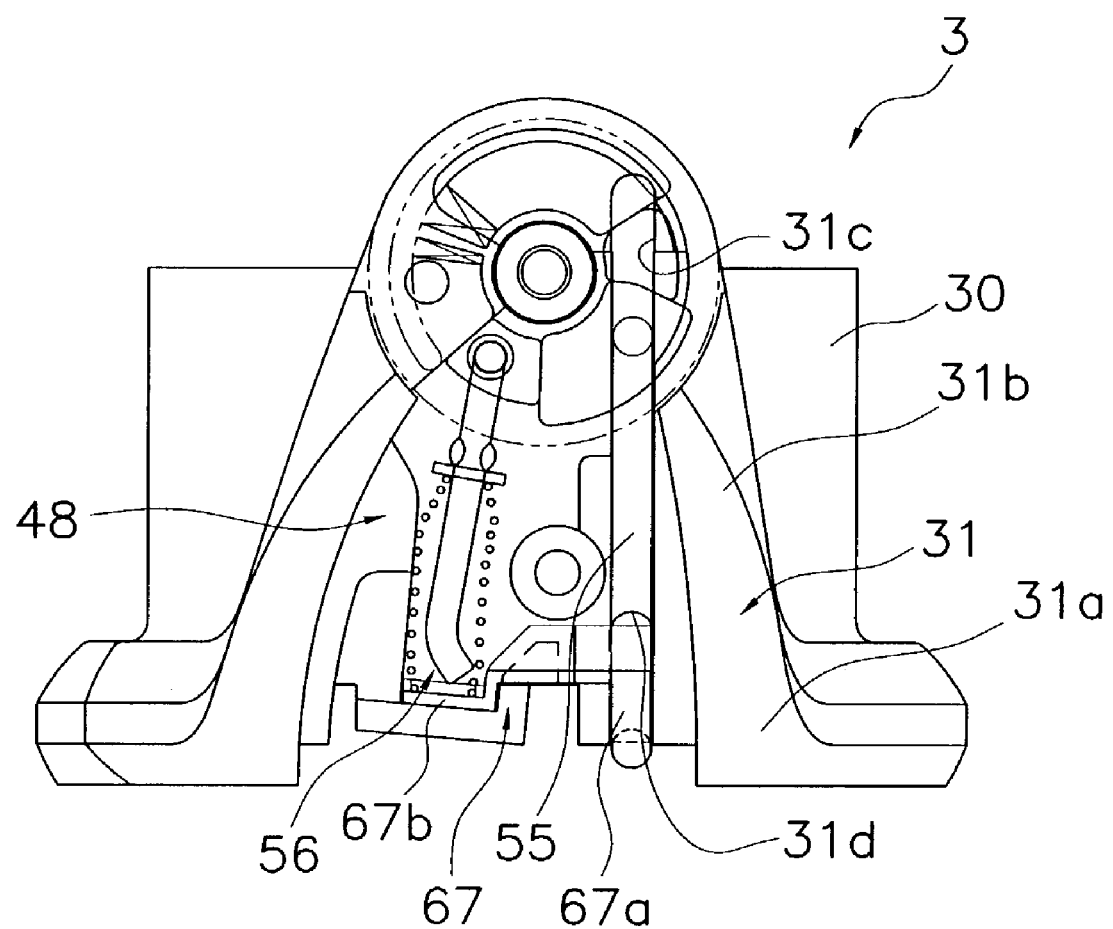
FIG. 4 is a plan view of the first rotor arm according to the embodiment of the present invention.

As shown in FIGS. 3 and 4, the first rotor arm 31 has a first connecting portion 31a disposed at a rear peripheral surface of the cylindrical portion 30, a first arm portion 31b curving out and extending frontward from the first connecting portion 31a, and a first cover member 46 covering the outside of the first connecting portion 31a and the first arm portion 31b. The first connecting portion 31a has a wider circumferential width at the rear end of the cylindrical portion 30 and is formed in smooth circumferential continuation with the cylindrical portion 30. The first arm portion 31b is formed in smooth continuation to the first connecting portion 31a and extends forward while spaced apart from the cylindrical portion 30. The first arm portion 31b extends frontward such that its tip widens at an angle of approximately 2° with respect to the spool shaft 15. A first bail-supporting member 40 is fitted pivotably onto the outer peripheral side of the front end of the first rotor arm portion 31b.

Referring to FIG. 2, the first bail-supporting member 40 is attached to the first rotor arm 31 by an attachment pin 37 screwed into the first rotor arm 31. The attachment pin 37 is made of a bolt with a hexagonal hole and smooth edges, such that the fishing line does not get caught at its head. A line roller 41 for guiding fishing line to the spool 4, and a fixed shaft cover 45 fixed to the first bail support member 40 are mounted to the front of the first bail support member 40, with the line roller 41 being arranged between the first bail support member 40 and the fixed shaft cover 45. The line roller 41 is rotatively fitted to the front end of the first bail-supporting member 40. The fixed shaft cover 45 has a deformed conical shape with a pointed front end. A fixed shaft 45a for rotatively supporting the line roller 41 is integrally formed to the fixed shaft cover 45. The tip of the fixed shaft 45a is fastened to the first bail-supporting member 40.

Figure 5:
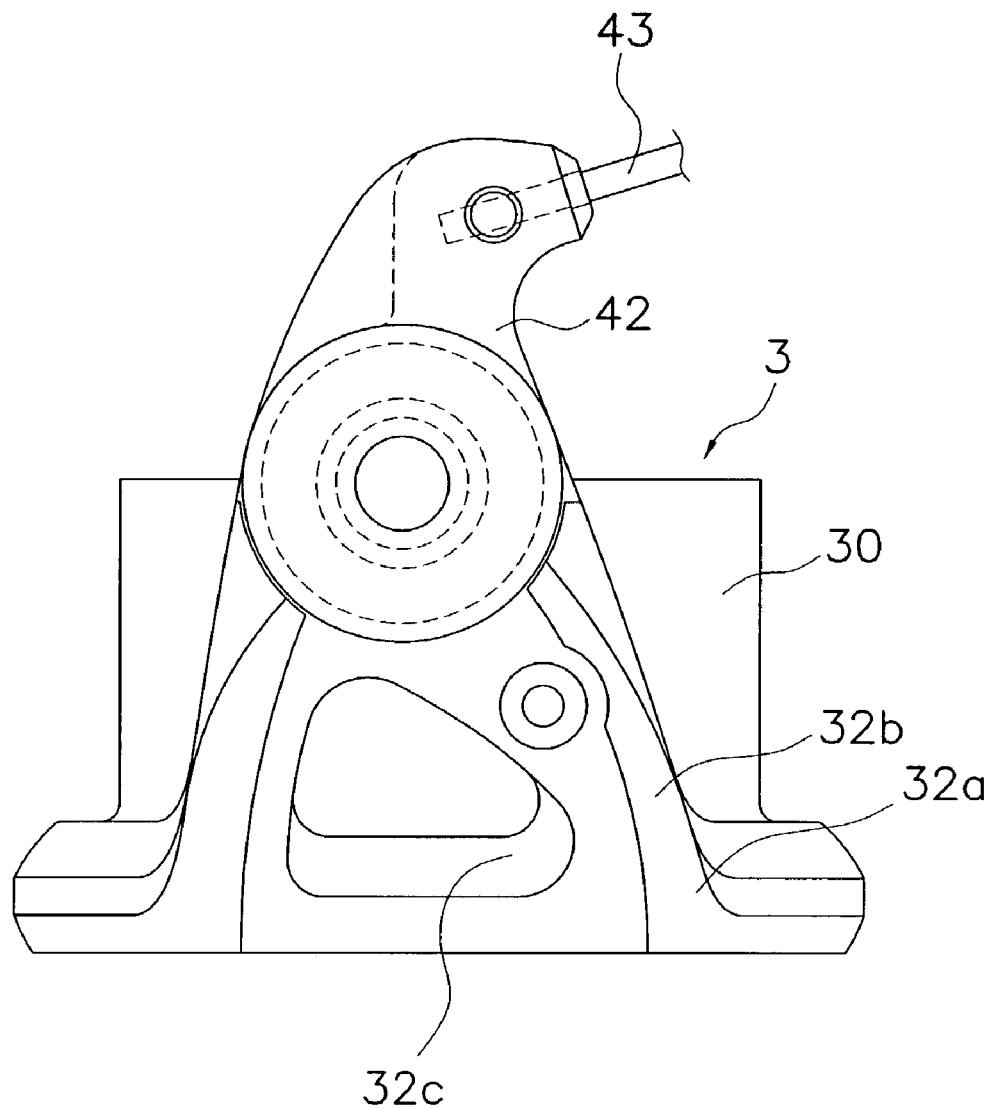
FIG. 5 is a plan view of the second rotor arm according to the embodiment of the present invention.

As shown in FIGS. 3 and 5, a second rotor arm 32 includes a second connection portion 32a disposed at the rear outer peripheral surface of the cylindrical portion 30 opposing the first connecting portion 31a, a second arm portion 32b curving out and extending frontward from the second connection portion 32a, and a second cover member 47 covering the outside of the second connection portion 32a and the second arm portion 32b. The second connection portion 32a is formed in smooth circumferential continuation with the cylindrical portion 30. The second arm portion 32b is also formed in smooth continuation with the second connection portion 32a, and extends frontward while spaced apart from the cylindrical portion 30. The second arm portion 32b extends frontward such that its front end side widens at an angle of approximately 2° with respect to the spool shaft 15. At its base, the second arm portion 32b is provided with a substantially triangular aperture 32c. A second bail support member 42 is mounted pivotably to the outer peripheral side at the front of the second arm portion 32b.

A bail 43 made of a wire rod bent into a substantially U-shape is fastened between the tip of the fixed shaft cover 45 and the second bail-supporting member 42, as shown in FIG. 3. The bail arm 44 for guiding fishing line onto the spool 4 includes the first and second bail-supporting members 40 and 42, the line roller 41, the bail 43, and the fixed shaft cover 45. The bail arm 44 can be pivoted between a line-winding posture shown in FIG. 2 and a line-releasing posture, which is attained by flipping the bail arm 44 over from the line-winding posture.

The first and the second cover members 46 and 47 are detachably mounted with screws to the outer peripheral side of the first and second rotor arms 31 and 32, respectively.

The first cover member 46 entirely covers the outer radial side of the first rotor arm 31. On its inside, a bail tripping mechanism 48 is disposed, which restores the bail arm 44 from the line-releasing posture to its line-winding posture when the rotor 3 starts rotating. The bail tripping mechanism 48 otherwise holds the bail arm 44 in its posture.

Figure 6:
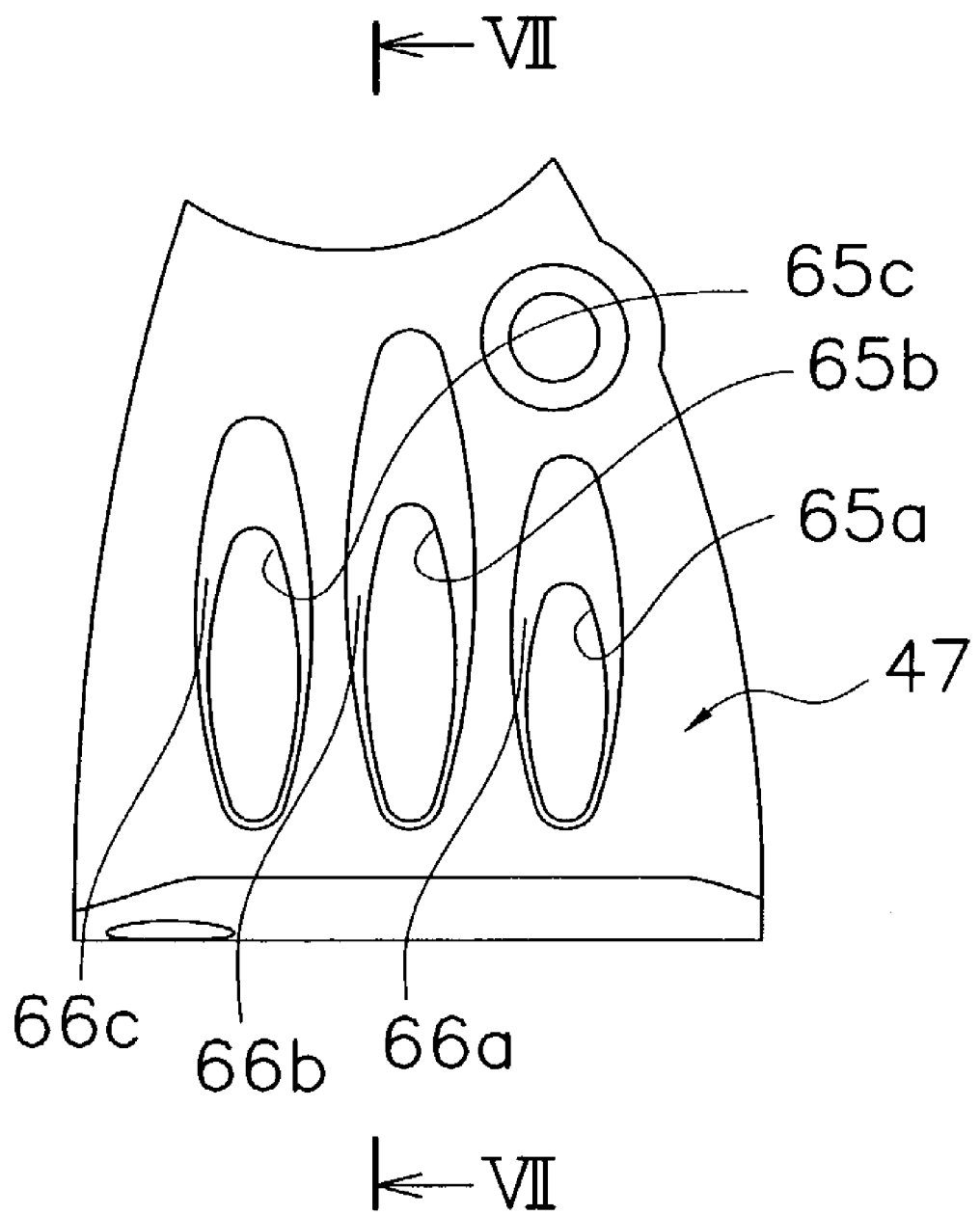
FIG. 6 is a plan view of the second cover member according to the embodiment of the present invention.
Figure 7:
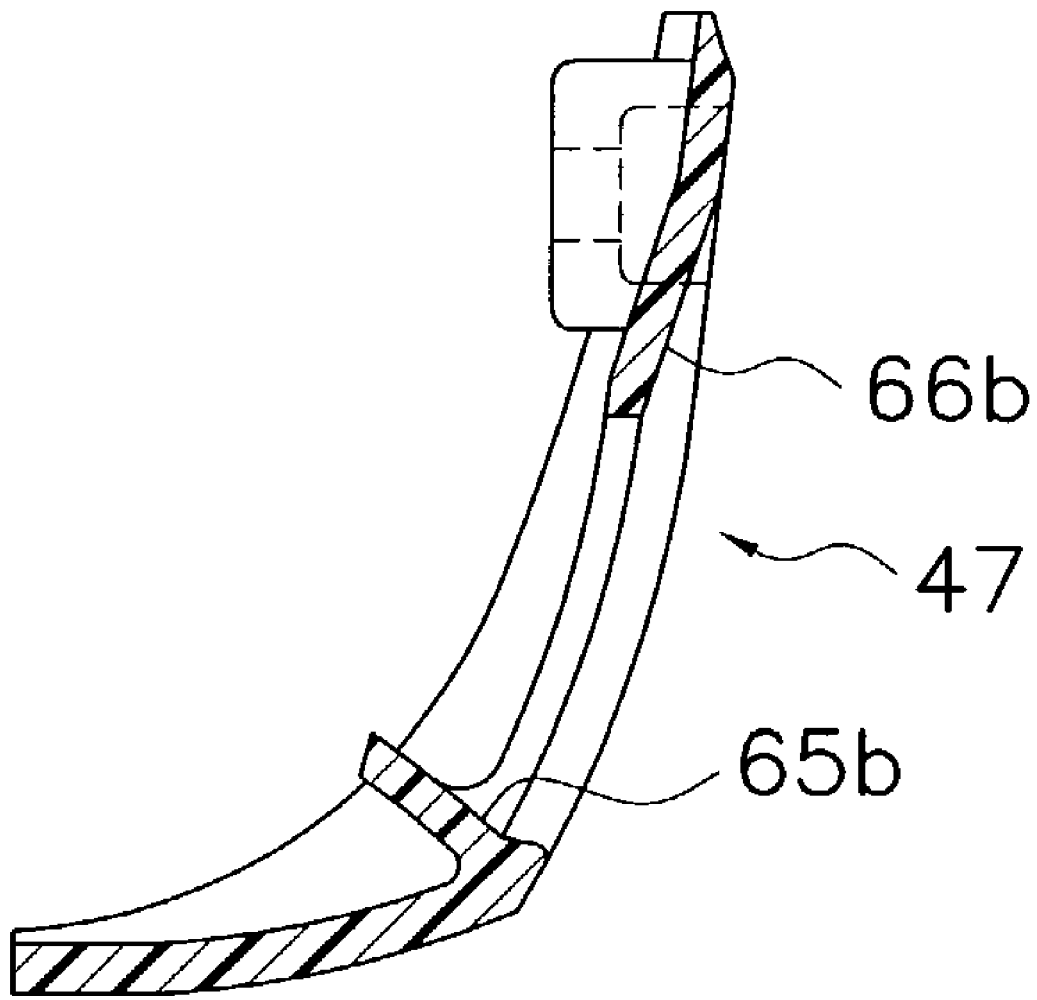
FIG. 7 is a cross-sectional view of the second cover member viewed along line VII—VII of FIG. 6.

The second cover member 47 covers the diametrical outside of the second rotor arm 32. As shown in FIGS. 6 and 7, the second cover member 47 is provided with three elliptical through holes 65a, 65b, and 65c (an example of uneven portions), so as to expose a portion of the aperture 32c of the second arm portion 32b. The through holes 65a, 65b, and 65c act as a mass adjustment portion for adjusting mass, and at the same time as a scratch prevention portion for preventing scratches to the second cover member 47 from widening. The concave through holes 65a, 65b, and 65c are formed at positions that are more recessed than other portions. Recessed portions 66a, 66b, and 66c (another example of uneven portions) that are slightly recessed obliquely toward the perimeter of the through holes 65a, 65b, and 65c are formed between the through holes 65a, 65b, and 65c and the surface of the second cover member 47.

Providing the through holes 65a, 65b and 65c and the recessed portions 66a, 66b and 66c, makes it possible to provide a product line of rotor arms of the same shape with different designs, and to provide different models of reels with different designs. Furthermore, since the mass can be adjusted with the through holes 65a, 65b and 65c, it becomes possible to suppress fluctuations of the rotational balance of the cover member 47 with different degrees of exposure of the aperture 32c.

The reason for providing a plurality of concave portions (through holes 65a, 65b, 65c) is described below.

Providing only one concave portion in the second cover member 47 reduces the area of the second cover member 47 that contacts the ground. However, the magnitude of pressure applied to the perimeter of the concave portion that contacts the ground is increased, which creates deeper scratches. As a result, a less attractive appearance is inevitable. Accordingly, in this embodiment, a plurality of concave portions are provided as the three through holes 65a, 65b, and 65c, and thus the contact force at the perimeter of the concave portions can be kept low. Accordingly, it becomes less likely that scratches will become deep. For this reason, the area of the second cover member 47 that contacts the ground when the fishing rod to which the reel is mounted is set on the ground is reduced. This reduction in contact area makes it possible to keep deep scratches from widening.

The explanation rendered above applies to a situation where the cover member has convex portions, as opposed to concave portions. In the case of convex portions also, having multiple convex portions, as opposed to a single convex portion, reduces the magnitude of pressure applied to the contact areas, which in this case are the convex surfaces.

In addition, the second arm portion 32b is purposefully disposed on the side that comes into contact with the ground (the side away from the fishing rod), so that the fishing line guide portion such as line roller 41 is necessarily disposed on the side near the fishing rod (the side away from the ground) when the rotor 3 is rotated. Accordingly, problems such as the fishing line catching on some object when the rotor 3 is rotated can be prevented.

In the rotor 3 configured as described above, the rotor arms 31 and 32 are curved outward, so that the bent-over portions have been eliminated, and no stress concentrations occur at this portion. Therefore, the stress is evened out, and the strength of the rotor arm can be sustained without making its walls thicker. Consequently, the strength can be increased while attaining a rotor 3 with lighter weight. Moreover, the cylindrical portion 30, the two connection portions 31a and 32a, and the two arm portions 31b and 32b are formed in smooth continuation of one another, so that also the stress at these connection portions is alleviated, and a higher strength can be sustained. Furthermore, the second rotor arm 32 is provided with an aperture 32c, so that an even lighter weight is attained. Moreover, the base portions of the two rotor arms 31 and 32 widen in the circumferential direction, so that also the stiffness of the rotor arms in the circumferential direction is increased, and an even higher strength can be sustained.

As shown in FIG. 4, the bail tripping mechanism 48 includes a shifting member 55 that at one end is engaged with the first bail-supporting member 40 and moves back and forth in the first rotor arm 31, a toggle spring mechanism 56 that toggles and biases the bail arm 44 into the line-releasing posture and the line-winding posture, and a switching protrusion 57 (FIG. 2) provided at the front surface of the rotation support portion 27.

The toggle spring mechanism 56 includes a guide shaft 56a that is engaged with the first bail-supporting member 40 at its front end, and a tapered coil spring 56b disposed around the guide shaft 56a. The toggle spring mechanism 56 toggles and biases the bail arm 44 into the line-releasing posture and the line-winding posture, sandwiching a dead center between them. The dead center of the toggle spring mechanism 56 is set near the line-releasing posture side.

Figure 8:
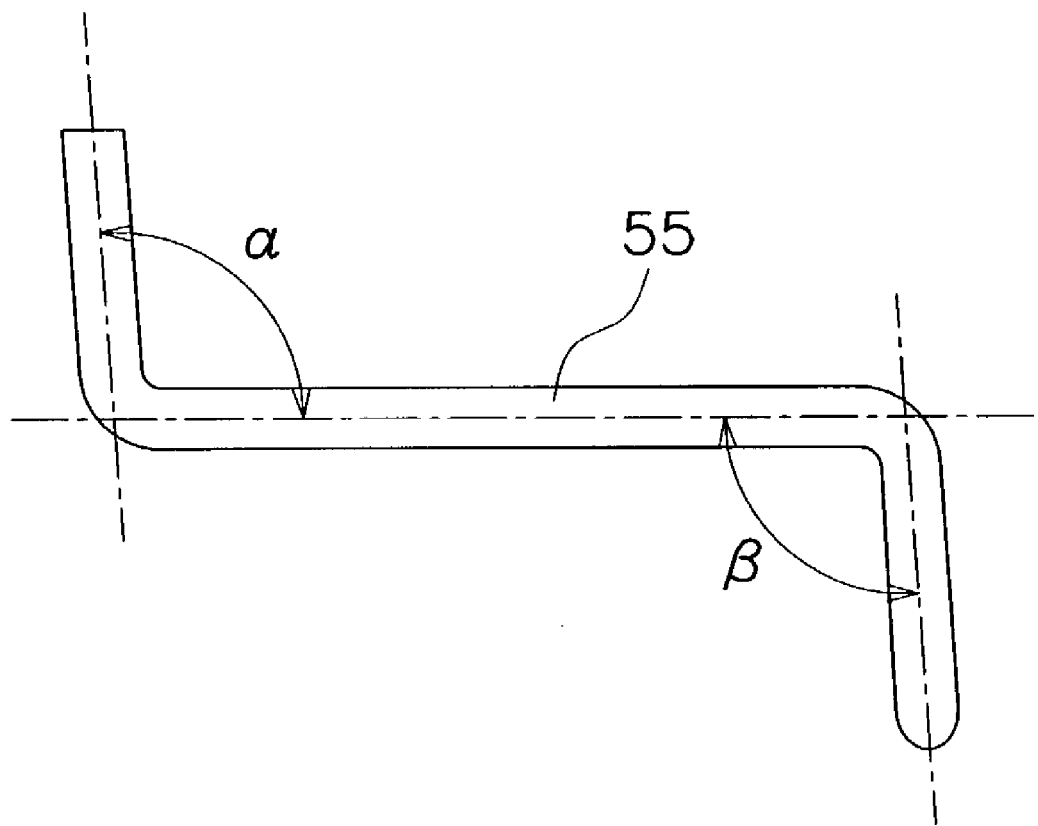
FIG. 8 is a lateral view of the shifting member according to the embodiment of the present invention.

The shifting member 55 is made of a wire and its two ends are bent over pointing into different directions. The shifting member 55 is guided by a guide groove 31c formed in the first arm portion 31b, and can be shifted back and forth with respect to the reel unit 2. The end of the guide groove 31c near the reel unit 2 is provided with a cutout portion 31d whose front end is semi-circular. Thus, by making the front end of the cutout portion 31d semicircular, stress concentrations can be averted, so that damages due to cracks originating therefrom become less likely. As shown in FIG. 8, the bent angles α and β on both sides of the shifting member 55 are for example about 92°, that is, slightly larger than 90°. Since the shifting member 55 is bent at angles that are slightly larger than 90°, the shifting member 55 can be guided along the first rotor arm 31 even when the first rotor arm 31 spreads to the front at about 2° with respect to the spool shaft 15.

As shown in FIG. 4, the shifting member 55 is pressed from the radial outer side by a presser member 67 on the base side of the first rotor arm 31, thus preventing it from being lifted up. The presser member 67 is a molded member made of synthetic resin, and includes a presser portion 67a pressing against the shifting member 55 and a spring holding portion 67b holding the base of the coil spring 56b. The presser member 67 is arranged in contact with the inner face of the first cover member 46, and it prevents the shifting member 55 from being lifted up with the presser portion 67a. The spring holding portion 67b holds the base of the coil spring 56b of the toggle spring mechanism 56 over a distance corresponding to one winding of the coil. Thus, even when the toggle spring mechanism 56 pivots, the coil spring 56b is kept from contacting the guide shaft 56a and faulty operation becomes less likely.

The switching protrusion 57 is constituted by an oblique surface that protrudes frontward at the front of the rotation support portion 27 and that is formed obliquely in the circumferential direction. When the handle 1 is turned in the line-winding posture, the base portion of the shifting member 55 that had been retreated by pivoting into the line-releasing posture contacts the switching protrusion 57, returning the bail arm 44 to the line-winding posture.

The rotor 3 is provided with a rotor braking mechanism 58 for braking the rotor 3 using the bail tripping mechanism 48. The rotor braking mechanism 58 is provided with the above-described shifting member 55 and a braking member 59 made of rubber, which contacts the base end surface of the shifting member 55 when in the line-releasing posture. When the bail arm 44 is pivoted into the line-releasing posture, the shifting member 55 retreats and contacts the braking member 59, and thus the rotor braking mechanism 58 brakes the rotor 3. The braking member 59 is mounted to an annular groove provided in the rotation support portion 27.

A reverse rotation prevention mechanism 50 for preventing reverse rotation of the rotor 3 is disposed inside the evacuation 3a. The reverse rotation prevention mechanism 50 has a roller-type one-way clutch 51 and an operation mechanism 52 for switching the one-way clutch 51 between an operative state and a non-operative state. An outer ring of the one-way clutch 51 is fixed to the casing 2a, and an inner ring thereof is mounted non-rotatively to the pinion gear 12. The operation mechanism 52 includes an operation lever 53 disposed to the rear of the casing 2a. The one-way clutch can be shifted between the two states by pivoting the operation lever 53. In the operative state, reverse rotation of the rotor 3 is not possible, whereas in the non-operative state, reverse rotation of the rotor 3 is possible.

Spool Configuration

The spool 4 is arranged between the first rotor arm 31 and the second rotor arm 32 of the rotor 3, and is fastened to the front end of the spool shaft 15 with the drag mechanism 60 interposed between them. The spool 4 is a member made of, for example, an aluminum alloy, and it includes a bobbin trunk portion 4a onto the outer periphery of which fishing line is wound, a skirt portion 4b formed unitarily with the rear of the bobbin trunk portion 4a, and a front flange portion 4c fastened to the front of the bobbin trunk portion 4a. The bobbin trunk portion 4a is a cylindrical member extending to the outer peripheral side of the cylindrical portion 30 of the rotor 3.

Configuration of Rotor Driving Mechanism

As shown in FIG. 2, the rotor driving mechanism 5 includes a main gear shaft 10, a main gear 11 and a pinion gear 12. The main gear 11 rotates together with the main gear shaft 10, on which the handle 1 is mounted non-rotatively. The pinion gear 12 meshes with the main gear 11. The pinion gear 12, which is a tubular member that rotates when the handle is turned, is pierced by the horizontally extending spool shaft 15. The pinion gear 12, which is an evacuation tubular member made of metal, is pierced by the spool shaft 15. The middle and the rear of the pinion gear 12 are supported rotatively with bearings 14a and 14b by the casing 2a. The rotor 3 is mounted non-rotatively to the front end 12a of the pinion gear 12. The bearing 14a on the front side is a ball bearing mounted to the inside of the rotation support portion 27. The bearing 14b on the rear side is a brimmed bushing.

Configuration of Oscillation Mechanism

The oscillating mechanism 6 reciprocates the spool 3 back and forth with the spool shaft 15 in cooperation with a rotation of the handle 1. The rotation of the handle 1 is transmitted to the oscillating mechanism 6 via the power transmission mechanism. As shown in FIG. 2, the oscillating mechanism 6 has a threaded shaft 21 arranged parallel to the spool shaft 15, a slider 22 that travels back and forth along the threaded shaft 21 by rotation of the threaded shaft 21, and a driven gear 23 mounted to the front end side of the threaded shaft 21. The rotation of the pinion gear 12 is reduced in speed and transmitted to the driven gear 23 by the power transmission mechanism. The spool 15 is non-rotatively attached to the slider 22, and thus the slider 22 moves back and forth with a rotation of the handle 1 and reciprocates the spool 4 back and forth.

Control and Operation of Reel

When casting with this spinning reel, the bail arm 44 is toppled from the line-winding posture to the line-releasing posture. Then, the fishing rod is swung and the tackle is cast out. Thus, fishing line is released in a helical fashion from the front end of the spool 4.

When taking up the fishing line, the bail arm 44 is toppled into the line-winding posture. This occurs automatically due to the bail tripping mechanism 48 when the handle 1 is rotated in the line-winding direction. When the handle 1 is rotated in the line-winding direction, the rotational force is transmitted to the pinion gear 12 via the main gear shaft 10 and the main gear 11. The rotational force transmitted to the pinion gear 12 is transmitted to the rotor 3 via the front portion 12a of the pinion gear 12, and the rotor 3 is rotated in the line-winding direction.

Meanwhile, the threaded shaft 21 is rotated by the driven gear 23 that meshes with the pinion gear 12 via the power transmission mechanism. Then, the slider 22, which meshes with the threaded shaft 21, is reciprocated back and forth with the rotation of the threaded shaft 21. The fishing line guided onto the spool 4 by the bail arm 44 is wound onto the bobbin trunk portion 4a of the spool 4, and thus the fishing line is wound onto the spool 4. The rotation balance does not fluctuate easily when the rotor 3 is rotating, even if the degree of opening exposure is changed, because the through holes 65a, 65b, and 65c have been provided in the second cover member 47 as mass adjustment members.

Other Embodiments

Referring now to FIGS. 9–14, a second cover member in accordance with other embodiments will now be explained. In view of the similarity with the first embodiment, the descriptions of the parts of these embodiments that are identical to the parts of the first embodiment will be omitted for the sake of brevity.

Figure 9:
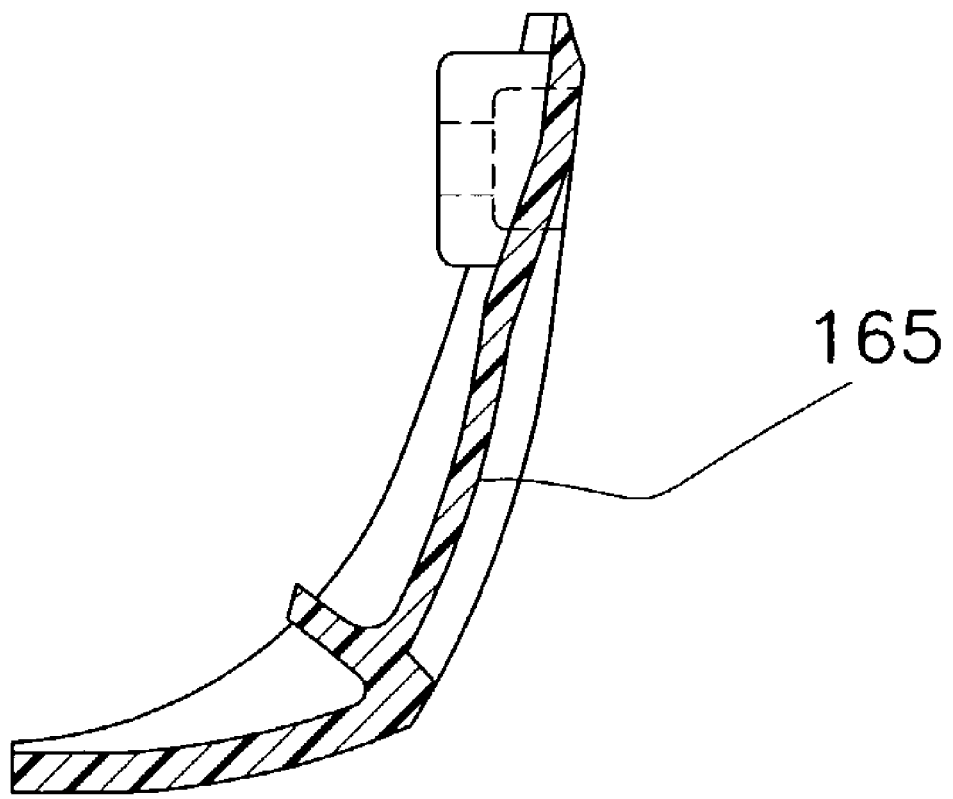
FIG. 9 is a cross-sectional view of the second cover member, which is equivalent to FIG. 7, according to another embodiment.
Figure 10:
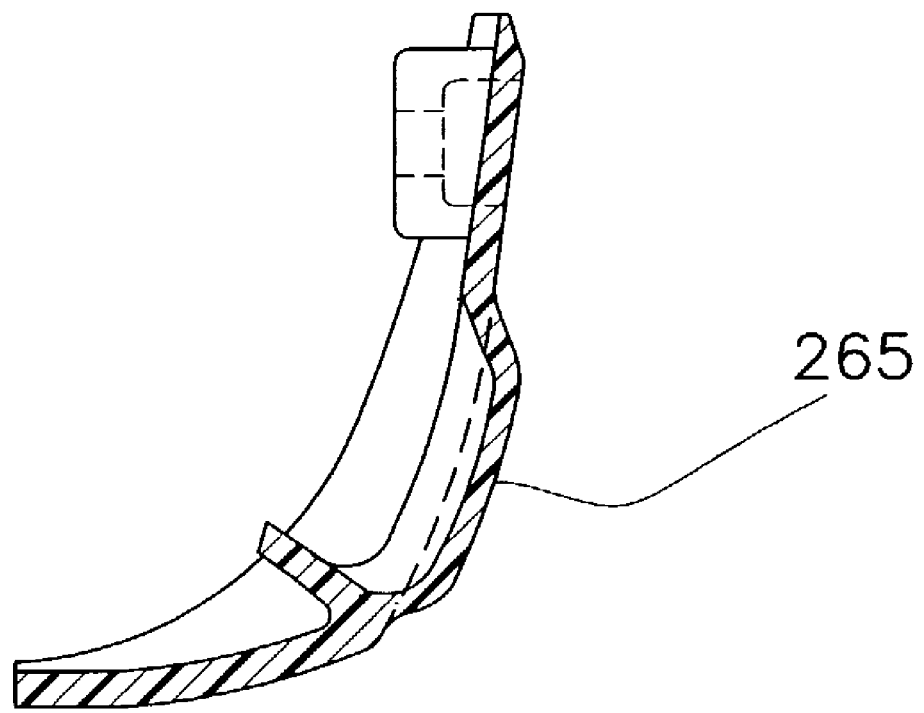
FIG. 10 is a cross-sectional view of the second cover member, which is equivalent to FIG. 7 according to still another embodiment.

(a) In the foregoing embodiment, three concave portions were formed by providing the three through holes 65a, 65b, and 65c in the second cover member 47 as the uneven portions. However, it is also possible to form a plurality of concave portions by providing a plurality of recessed portions 165 as shown in FIG. 9 or a plurality of prominent portions 265 as shown in FIG. 10. Forming the uneven portions using recessed or convex portions instead of through holes makes it easier to hermetically close the interior of the cover member and prevent the corrosion of mechanisms accommodated within its interior. Also, providing uneven portions that are convex increases the interior space of the cover member, and this facilitates the accommodation of mechanisms such as the bail tripping mechanism.

Figure 11:
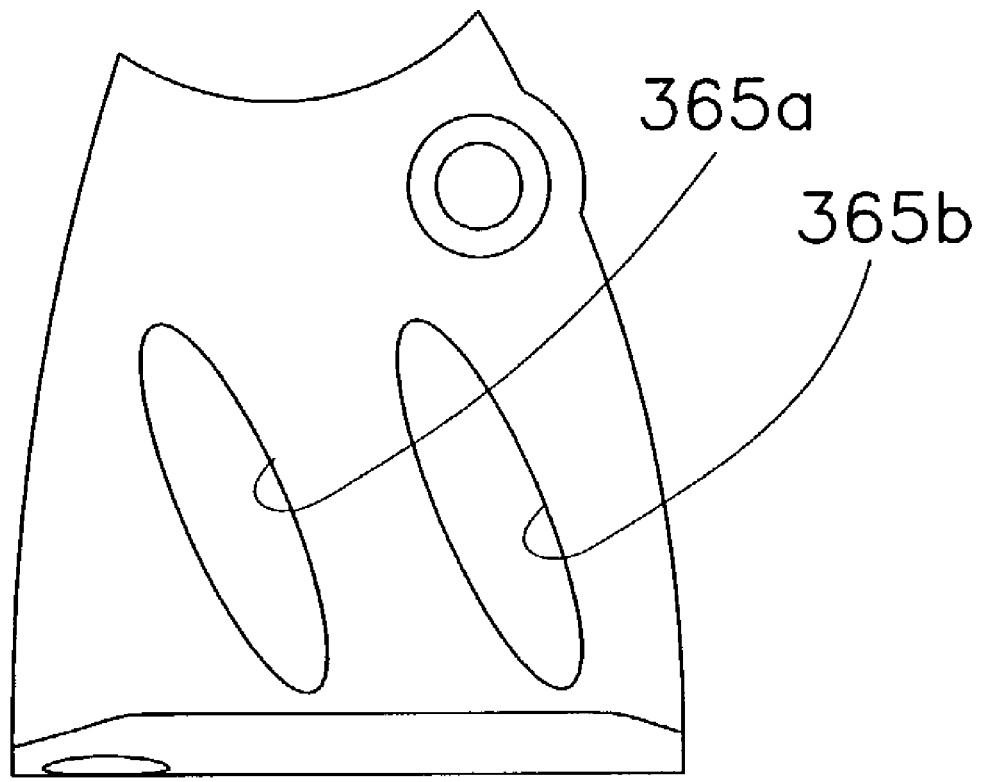
FIG. 11 is a plan view of the second cover member, which is equivalent to FIG. 6, according to still another embodiment.
Figure 12:
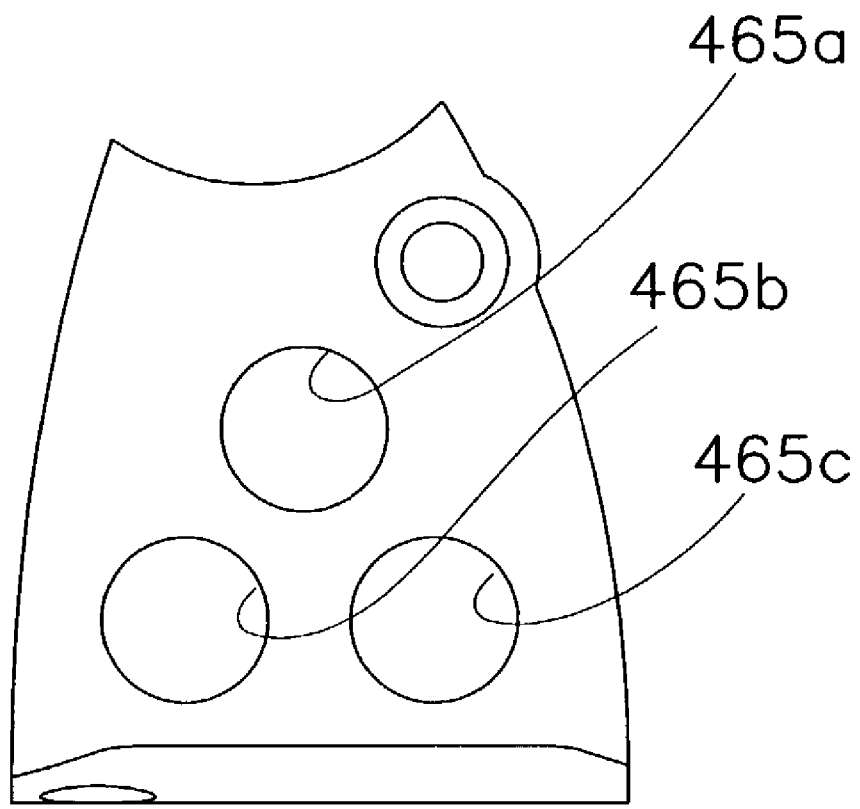
FIG. 12 is a plan view of the second cover member, which is equivalent to FIG. 6, according to still another embodiment.
Figure 13:
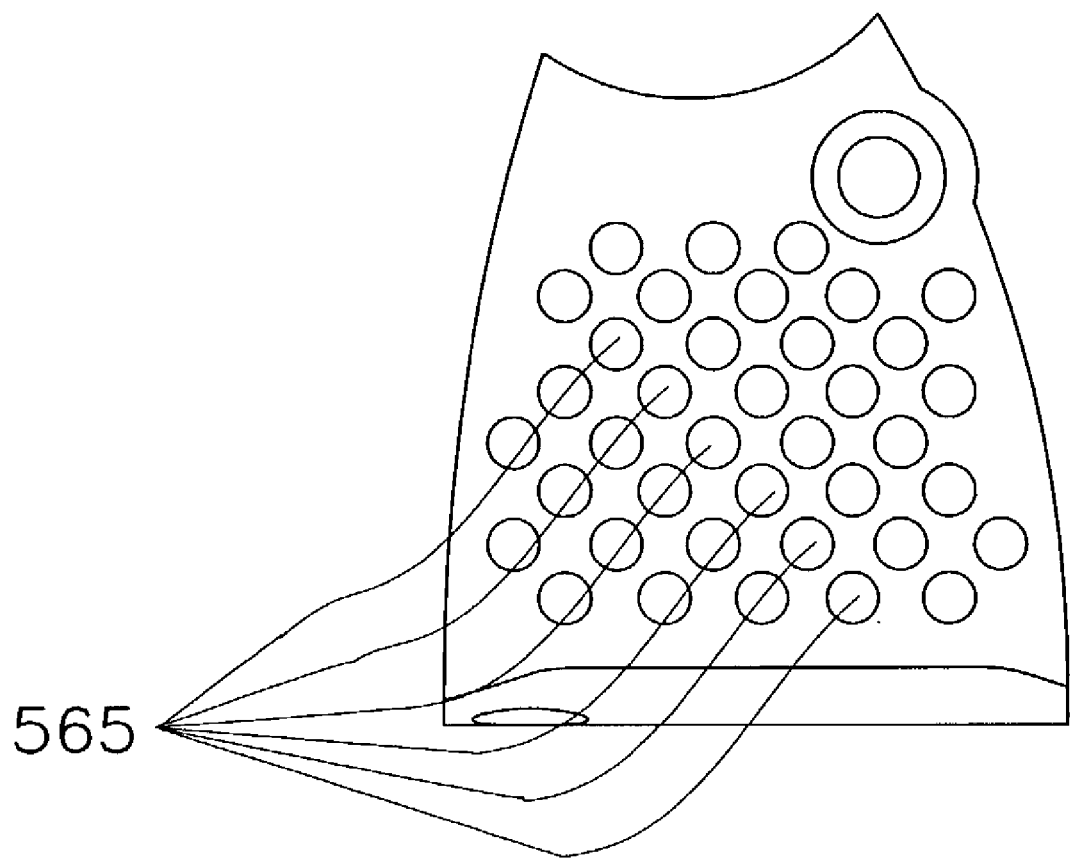
FIG. 13 is a plan view of the second cover member, which is equivalent to FIG. 6, according to still another embodiment.

(b) In the foregoing embodiment, elliptical uneven portions extending substantially parallel to the spool shaft were provided, however, the uneven portions are not limited to the shape according to the foregoing embodiment, and may be of any shape. For example, the uneven portions may be oval-shaped uneven portions 365a and 365b tilted with respect to the spool shaft as shown in FIG. 11 or circular uneven portions 465a, 465b, and 465c as shown in FIG. 12. Also, the number of uneven portions is not limited to the number in the foregoing embodiment. There can be any number of uneven portions. For example, there can be numerous uneven portions 565 as shown in FIG. 13, some of which are aligned in the direction parallel to the spool shaft 15.

(c) The foregoing embodiment was described using a front-drag type spinning reel as an illustrative example. However, the present invention can also be applied to the rotor of rear-drag type spinning reels and lever brake type spinning reels.

(d) In the foregoing embodiment, a plurality of uneven portions were formed in the second cover member 47 covering the outside of the second rotor arm 32. But it is also possible to provide a plurality of uneven portions in the first cover member 46 covering the exterior of the first rotor arm 31. In addition, it is also possible to form uneven portions in both cover portions 46 and 47.

Figure 14:
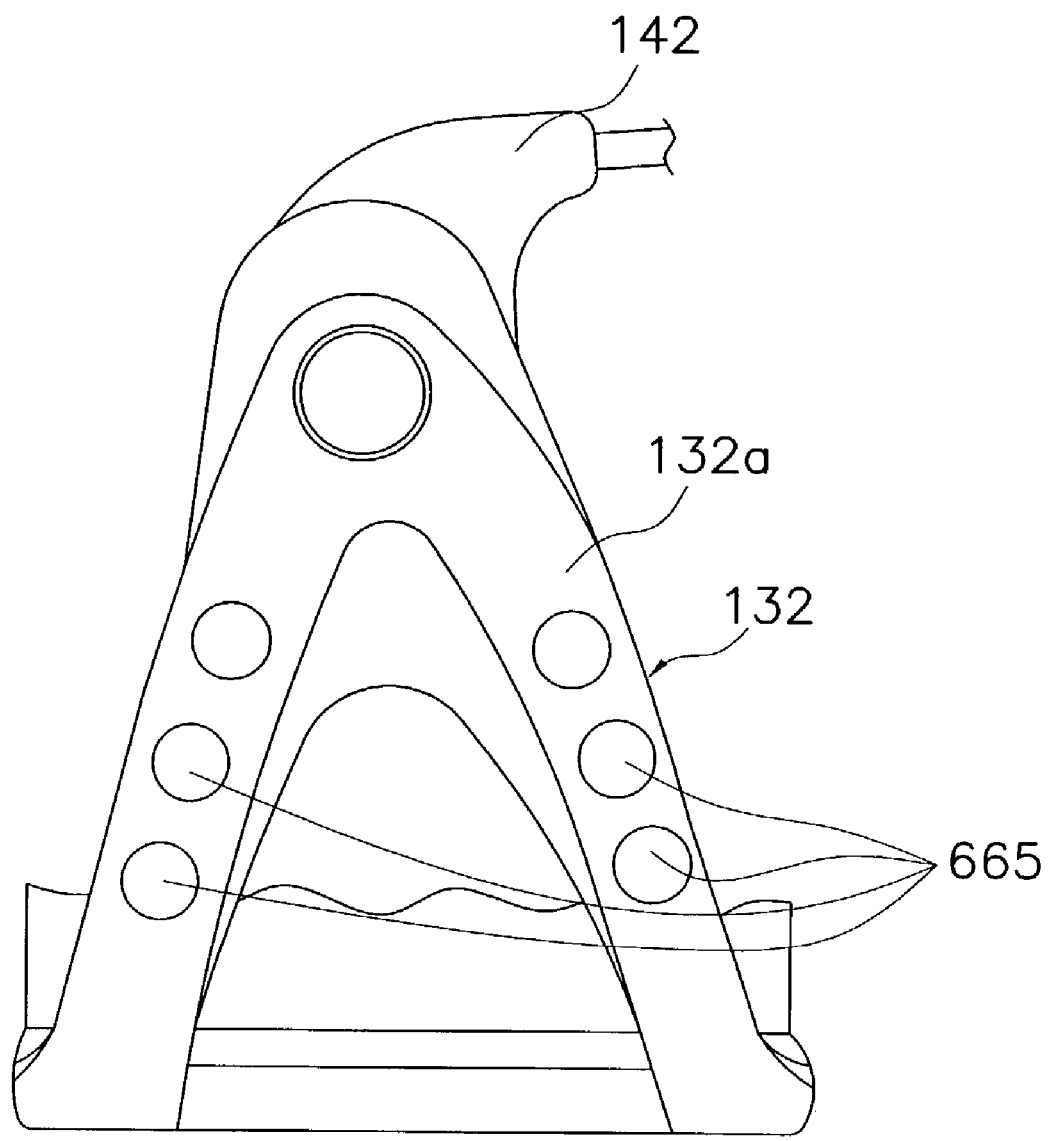
FIG. 14 is a plan view of the second rotor arm, which is equivalent to FIG. 5, according to still another embodiment.

(e) In the foregoing embodiment, cover members were fitted to the rotor arms, but it is also possible to form a plurality of uneven portions into rotor arms that lack a cover member. For example, as shown in FIG. 14, it is possible to form a plurality of uneven portions 665 into a second arm portion 132b of a second rotor arm 132 that lacks a cover member. In this case, a second bail supporting member 142 is pivotably mounted inside the second rotor arm 132.

According to the present invention, a plurality of uneven portions are formed in the outer surface of the rotor arm, and thus there is a smaller area of contact with the ground if the spinning reel, still mounted to the fishing rod, is placed on the ground than in a case where there are not a plurality of uneven portions. For this reason, scratches resulting from use are unlikely to spread over the entire reel, and scratches on the rotor arm can be kept from making the spinning reel unattractive. Moreover, because it is not necessary to provide a protector, an increase in costs can be curbed without adversely affecting the classic look of the reel.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2002-074202. The entire disclosure of Japanese Patent Application No. 2002-074202 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A spinning reel rotor rotatively adapted to be fitted to a reel unit of a spinning reel for winding fishing line onto a spool, the spinning reel rotor comprising:
   a supporting portion rotatively fitted to an end of the reel unit;
   first and second rotor arms extending in a direction away from the reel unit from diametrically opposing positions on a reel unit side end portion of said supporting portion, at least one of said first and second rotor arms having a plurality of uneven portions formed on its outside surface, said plurality of uneven portions being elliptical; and
   a bail arm for guiding fishing line, pivotably mounted to front ends of said first and second rotor arms.

2. The spinning reel rotor according to claim 1, wherein said first and second rotor arms include:
   first and second connection portions disposed diametrically opposite each other on an outer peripheral surface of said supporting portion near the reel unit;
   first and second arm portions extending from said first and second connection portions in a directions away from the reel unit; and
   a cover member covering an outside surface of at least one of said first and second arm portions and having said plurality of uneven portions in its outside surface.

3. The spinning reel rotor according to claim 2, wherein said cover member is detachably mounted to said at least one of said first and second arm portions.

4. The spinning reel rotor according to claim 2, wherein said bail arm includes:
   first and second bail-supporting members pivotably mounted to front ends of said first and second rotor arms, respectively;
   a fixed shaft provided in said first bail-supporting member;
   a line roller rotatively mounted to said fixed shaft;
   a fixed shaft cover provided at a front end of said fixed shaft; and
   a bail connecting said second bail-supporting member and said fixed shaft cover, and
   said cover member covers an outside surface of said second arm portion.

5. The spinning reel rotor according to claim 2, wherein said plurality of uneven portions include through holes formed on said cover member.

6. The spinning reel rotor according to claim 5, wherein said plurality of uneven portions further include recessed portions formed on said cover member.

7. The spinning reel rotor according to claim 1, wherein said plurality of uneven portions include recessed portions formed on an outside surface of one of said first and second rotor arms.

8. The spinning reel rotor according to claim 1, wherein said plurality of uneven portions include convex portions formed on an outside surface of one of said first and second rotor arms.

9. A spinning reel adapted to be mounted to a fishing rod, comprising:
   a handle;
   a reel unit rotatively supporting said handle and adapted to be mounted to the fishing rod;
   a rotor rotatively supported at a front of said reel unit and including
      a supporting portion rotatively fitted to an end of said reel unit,
      first and second rotor arms extending frontward from diametrically opposing positions on a reel unit side end portion of said supporting portion, at least one of said first and second rotor arms having a plurality of uneven portions formed on its outside surface, said plurality of uneven portions being elliptical, and
      a bail arm for guiding fishing line, pivotably mounted to front ends of said first and second rotor arms; and
   a spool disposed at a front of said rotor so as to be shiftable front and rear, said rotor being for winding fishing line onto an outer periphery of said spool.

10. The spinning reel according to claim 9, wherein said first and second rotor arms include:
   first and second connection portions disposed diametrically opposite each other on an outer peripheral surface of said supporting portion near said reel unit;
   first and second arm portions extending frontward from said first and second connection portions; and
   a cover member covering an outside surface of at least one of said first and second arm portions and having said plurality of uneven portions in its outside surface.

11. The spinning reel according to claim 10, wherein said cover member is detachably mounted to said at least one of said first and second arm portions.

12. The spinning reel according to claim 10, wherein said bail arm includes:
   first and second bail-supporting members pivotably mounted to front ends of said first and second rotor arms, respectively;
   a fixed shaft provided in said first bail-supporting member;
   a line roller rotatively mounted to said fixed shaft;
   a fixed shaft cover provided at a front end of said fixed shaft; and
   a bail connecting said second bail-supporting member and said fixed shaft cover, and
   said cover member covers an outside surface of said second arm portion.

13. The spinning reel according to claim 10, wherein said plurality of uneven portions include through holes formed on said cover member.

14. The spinning reel according to claim 13, wherein said plurality of uneven portions further include recessed portions formed on said cover member.

15. The spinning reel according to claim 9, wherein said plurality of uneven portions include recessed portions formed on an outside surface of one of said first and second rotor arms.

16. The spinning reel according to claim 9, wherein said plurality of uneven portions include convex portions formed on an outside surface of one of said first and second rotor arms.

17. A spinning reel adapted to be mounted to a fishing rod, comprising:
   a handle;
   a reel unit rotatively supporting said handle and adapted to be mounted to the fishing rod;

a rotor rotatively supported at a front of said reel unit and including
- a supporting portion rotatively fitted to an end of said reel unit,
- first and second rotor arms extending frontward from diametrically opposing positions on a reel unit side end portion of said supporting portion, at least one of said first and second rotor arms having a plurality of uneven portions formed on its outside surface, and
- a bail arm for guiding fishing line, pivotably mounted to front ends of said first and second rotor arms; and a spool disposed at a front of said rotor so as to be rotatable around a spool shaft and shiftable front and rear, said rotor being for winding fishing line onto an outer periphery of said spool, at least three of said plurality of uneven portions being aligned in a direction parallel to a direction of the spool shaft.

18. A spinning reel adapted to be mounted to a fishing rod, comprising:
- a handle;
- a reel unit rotatively supporting said handle and adapted to be mounted to the fishing rod;
- a rotor rotatively supported at a front of said reel unit and including
  - a supporting portion rotatively fitted to an end of said reel unit,
  - first and second rotor arms extending frontward from diametrically opposing positions on a reel unit side end portion of said supporting portion, at least one of said first and second rotor arms having a plurality of uneven portions formed on its outside surface, and
  - a bail arm for guiding fishing line, pivotably mounted to front ends of said first and second rotor arms; and
- a spool disposed at a front of said rotor so as to be rotatable around a spool shaft and shiftable front and rear, said rotor being for winding fishing line onto an outer periphery of said spool,
- at least one of said uneven portions being diagonally aligned, horizontally aligned and vertically aligned with one or more of the remaining uneven portions.

* * * * *